United States Patent [19]

Kobayashi

[11] Patent Number: 5,035,488
[45] Date of Patent: Jul. 30, 1991

[54] METHOD OF MANUFACTURING LIQUID CRYSTAL DEVICES HAVING SEMICONDUCTOR SWITCHING ELEMENTS

[75] Inventor: Ippei Kobayashi, Atsugi, Japan

[73] Assignee: Semiconductor Energy Laboratory Co., Ltd., Kanagawa, Japan

[21] Appl. No.: 204,862

[22] Filed: Jun. 10, 1988

[30] Foreign Application Priority Data

Dec. 7, 1987 [JP] Japan .................. 62-146683

[51] Int. Cl.⁵ .................................. G02F 1/13
[52] U.S. Cl. ............................ 350/333; 350/332; 350/334; 350/336; 350/339 R
[58] Field of Search .......... 350/332, 334, 336, 339 R, 350/350 S, 333; 437/180, 181, 189, 192, 194, 170, 172, 173; 357/23.4, 23.7, 23.9, 23.11; 427/12, 14, 15, 28

[56] References Cited

U.S. PATENT DOCUMENTS

| | | | |
|---|---|---|---|
| 3,904,782 | 9/1975 | Pomerantz | 427/12 |
| 3,935,333 | 1/1976 | Muneoka et al. | 427/12 X |
| 4,013,531 | 3/1977 | Nakamura et al. | 427/13 X |
| 4,169,903 | 10/1979 | Scholes | 427/28 |
| 4,340,786 | 7/1982 | Tester | 427/12 X |
| 4,478,690 | 10/1984 | Scholtens | 427/12 X |
| 4,554,172 | 11/1985 | Harrison | 427/12 |
| 4,712,872 | 12/1987 | Kanbe et al. | 350/333 |
| 4,806,496 | 2/1989 | Suzuki et al. | 437/170 |
| 4,820,024 | 4/1989 | Nishiura | 350/333 |

FOREIGN PATENT DOCUMENTS

| | | | |
|---|---|---|---|
| 58-182835 | 10/1983 | Japan | 427/12 |
| 952889 | 8/1982 | U.S.S.R. | 427/12 |

Primary Examiner—Stanley D. Miller
Assistant Examiner—Anita Pellman Gross
Attorney, Agent, or Firm—Sixbey, Friedman, Leedom & Ferguson

[57] ABSTRACT

An improved method of manufacturing liquid crystal devices is described. The liquid crystal device consists of a pair of substrates, a liquid crystal layer disposed between the substrates, an electrode arrangement including driving devices for applying an electric field to the liquid crystal layer. The driving device is formed of a semiconductor film having a pin junction. The method includes the step of repairing short current paths present in the semiconductor film by applying a reverse voltage to the driving device.

6 Claims, 8 Drawing Sheets

FIG. 5 (A)
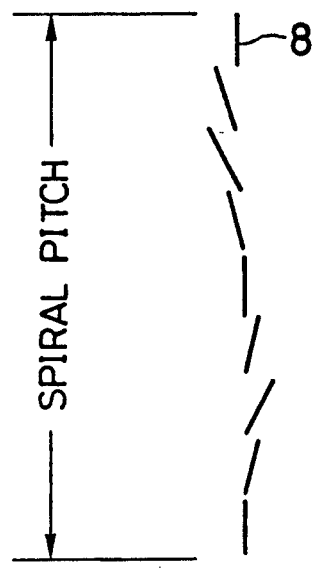
FIG. 5 (B)    FIG. 5 (C)
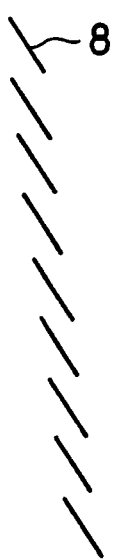    

METHOD OF MANUFACTURING LIQUID CRYSTAL DEVICES HAVING SEMICONDUCTOR SWITCHING ELEMENTS

BACKGROUND OF THE INVENTION

This invention relates to a method of manufacturing liquid crystal devices.

A variety of solid display devices replacing CRTs have been developed, such as liquid crystal displays, displays utilizing electrochromic phenomena and displays utilizing gas discharge. Particularly, liquid crystal devices have been found to be suitable for practical use because of quick response and high power efficiency.

In recent years, however, along with the increasing information to be treated, the number of pixels has been monotonically increasing. While the quality of products can be kept if the displays have a small number of pixels with twisted nematic liquid crystal, the quality of a displayed image necessarily becomes poor due to crosstalk and other causes when the displays are designed to have a large number of pixels, e.g. 640×400. Attempts have been made; hitherto to deal with this, for example, making use of the SBE mode for twisted nematic liquid crystal devices or making use of semiconductor devices for switching pixels.

When thin film transistors are used to drive TN active matrix liquid crystal displays, the production cost becomes high because of the formation process of the transistors incurring additional costs and the low production yield of the transistors, whereas the provision of the transistors makes the quality of a displayed image high. Further, the response speed of such a liquid crystal display is low, and therefore it is not suitable for use of such an application that quick response is desired.

Displays utilizing ferroelectric liquid crystals have been proposed by N. A. Clark et al. to realize quick response. (Japanese Patent Disclosure No. sho56-107216). In liquid crystal devices of this type, liquid crystal molecules take one of two states (I) and (II) as illustrated in FIG. 1. The direction of anisotropy of the liquid crystal is the direction of the long axis (director) of the molecules. The angle $\theta$ between the director and the central line is termed the tilted angle. FIG. 3 shows an example of a signal which is applied to the liquid crystal display in order to change the states of ferroelectric liquid crystal molecules.

The molecule takes either of the two states in accordance with the direction of the applied electric field normal to the plane of the drawing sheet, by virtue of the dielectric moment of the molecule which is also normal to the plane of the drawing sheet.

In liquid crystal devices, ferroelectric liquid crystal is sandwiched by a pair of substrates having an electrode arrangement on the inside surfaces and the molecules are aligned parallel to the inside surfaces of the substrates contiguous to the liquid crystal. The liquid crystal devices have bistability by virtue of the interaction between the inside surfaces and the liquid crystal molecules.

On the other hand, such ferroelectric liquid crystal molecules have a tendency to form spirals which hinder the formation of anisotropic structure in the liquid crystal layer. To unwind the spiral the distance between the substrates is selected to be 1-3 microns. The short distance makes it difficult to manufacture such liquid crystal displays.

Furthermore, the low production yield of active devices for driving the liquid crystal displays has posed a difficult problem in attempts to reduce the production cost.

SUMMARY OF THE INVENTION

It is therefore an object of the invention to provide a method of manufacturing liquid crystal devices at a high yield of production.

It is another object of the invention to provide a method of manufacturing liquid crystal devices in which high reliability can be expected.

BRIEF DESCRIPTION OF THE DRAWINGS

FIGS. 5(A) to (C) are schemtic illustrations showing molecular arrangements of ferroelectric liquid crystals.

DETAILED DESCRIPTION OF THE PREFERRED EMBODIMENTS

Figure 1:
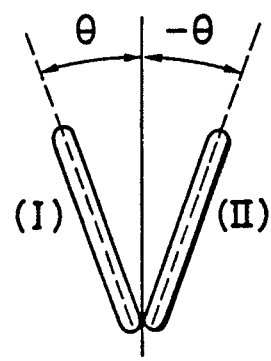
FIG. 1 is a schematic illustration showing the bistability of ferroelectric liquid crystal molecules.
Figure 2:
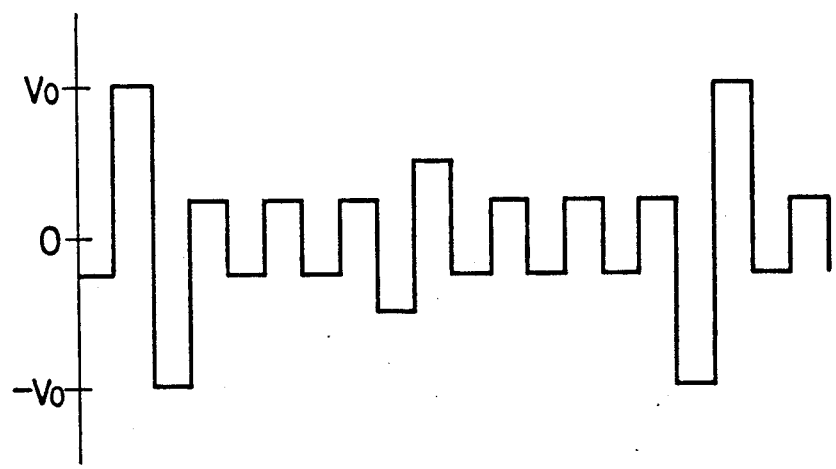
FIG. 2 is a graphical diagram showing an example of a driving signal for a liquid crystal device.

Referring to FIGS. 3(A) to 3(D), a process of manufacturing liquid crystal displays in accordance with the present invention is illustrated.

A 300 Å thick molybdenum film 9 is formed as a first electrode for liquid crystal display on a glass substrate 2. Amorphous silicon semiconductor films of P-type, I-type and N-type are stacked in order to form a pin diode 12 (non-linear element) on the first electrode 9 by a known CVD method. Further, a second electrode 10 is formed from a 2000 Å thick molibdenum film on the amorphous semiconductor films 12 (FIG. 3(A)).

A voltage is applied between the first and second electrodes 9 and 10 in the reverse direction of the pin diode 12. The voltage is up to 10 V and applied across the semiconductor device 12 while the voltage level is gradually elevated from 0 V to 10 V. By virtue of the reverse voltage, pin holes which might be present in the semiconductor films can be burnt and insulated (FIG. 3(B)).

Figure 3:
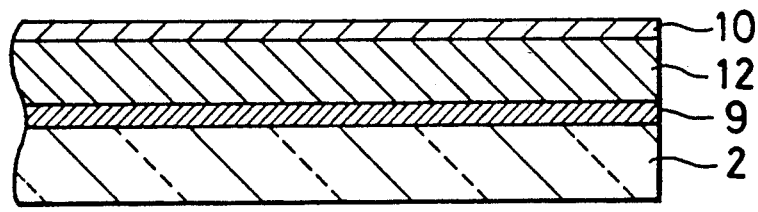
FIGS. 3(A) to 3(D) are cross sectional views showing a manufacturing process in accordance with the present invention.
Figure 3:
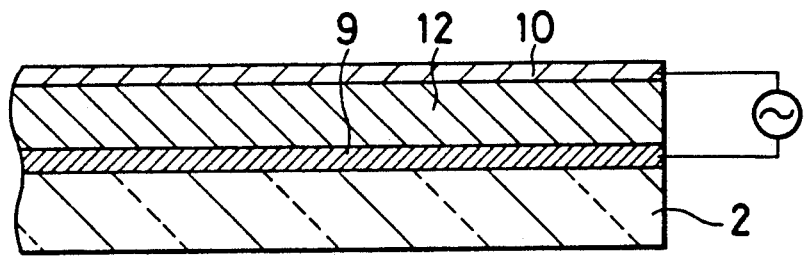
Figure 3:
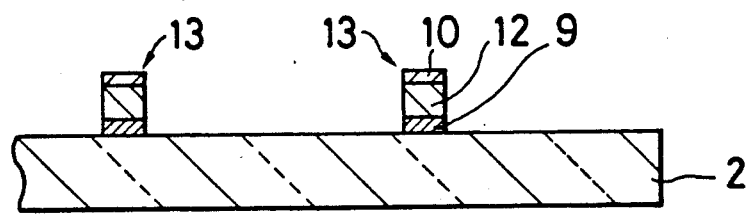
Figure 3:
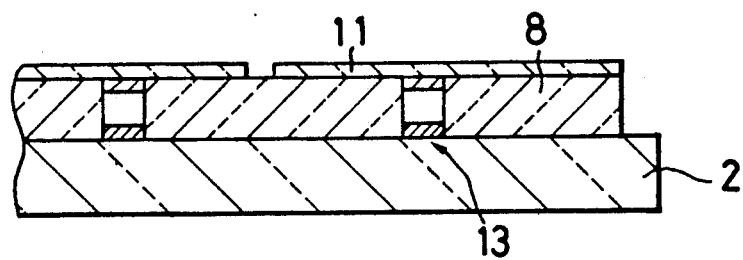

Next, the structure is patterned by a known etching to form a plurality of pin diodes 13 (FIG. 3(C)). The patterning treatment is designed so that each diode 13 occupies 1/35 of the effective area of a corresponding pixel. An insulating layer 8 is disposed between the diodes 13 in order to make its upper surface flush with the upper surfaces of the diodes 13. The insulating layer 8 is formed by coating the substrate 2 with a photosensitive polyimide over the diodes 13, exposing the polyimide to illumination through a mask, and removing the portion overlying the diodes 13. The diodes can be used as the mask by irradiating the polyimide layer through the substrate. Other organic resins or silicon oxide may be used instead of polyimide. Then, pixel electrodes 11 are formed on the insulating layer 8 over the diodes 13 in matrix form (FIG. 3(D)). The pixel electrodes 11 are made of ITO for example. The inside surface (upper surface) of the structure is given alignment control treatment.

Figure 4:
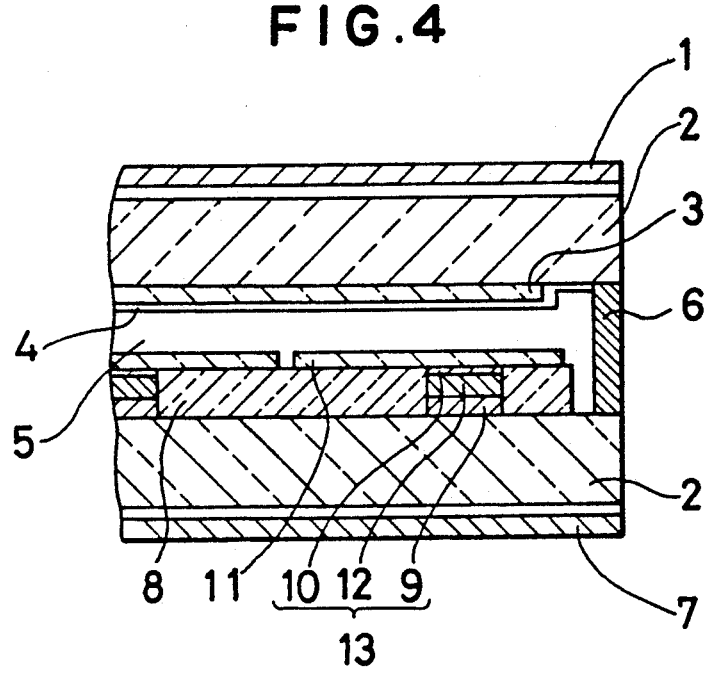
FIG. 4 is a cross sectional view showing a liquid crystal device manufactured in accordance with the present invention.

An opposite substrate is prepared by a known method. Namely, an opposite transparent electrode arrangement 3 is formed on a glass substrate and covered by an alignment control film. An alignment control film 4 is coated on the substrate 2 over the electrode arrangement 3 (FIG. 4). This opposite substrate and the above described substrate carrying the diodes 13 are mated with a sealing adhesive 6 on the peripheral edge as shown in FIG. 4. At least one inside of the substrates is given rubbing treatment. The electrode arrangement 3 is designed associated with the pixel electrodes 11 to address particular pixels. A ferroelectric liquid crystal material (of chiral smectic) is disposed between the substrates 2. The distance between the substrates 2 is selected to be 10 microns so that the liquid crystal takes spiral form when no electric application exists. When an electric field is applied to the liquid crystal by means of the opposing electrodes 3 and 11, the molecules of the liquid crystal are directed along one of the two directions in accordance with the direction of the applied electric field. FIG. 5(A) schematically shows the molecular condition of the liquid crystal in the absence of an applied electric field, FIG. 5(B) in the existence of an electric field and FIG. 5(C) in the existence of the electric field in the opposite direction. The spiral pitch is, e.g. 1.8 microns and the tilted angle of either alignment direction with respect to the spiral axis is, e.g. about 19°. Reference numeral 8 denotes the liquid crystal molecules. The liquid crystal layer between the substrates 2 exhibits optical anisotropy along the direction in which the liquid crystal molecules are aligned. With this construction, the anisotropical characteristic of the device can be controlled by switching the direction of the voltage applied to the electrodes 3 and 11. On both sides of the device are polarizing plates 1 and 7. The plate 1 is aligned to have its polarization direction along one of the alignment directions of the liquid crystal as illustrated in FIG. 5(B), and the plate 7 to have its polarization direction perpendicular to the polarization direction of the plate 1. Light passing through the device and the plates is modulated in accordance with the anisotropy of the liquid crystal. Namely, by selecting the sense of the voltage applied to the opposing electrodes 3 and 11 (including zero V if desired), light transmission can be controlled.

When the liquid crystal assumes its molecular state as illustrated in FIG. 5(B) by virtue of an applied voltage, the device is opaque since the anisotropical direction of the liquid crystal and the polarization direction of plate 1 are the same. When the applied voltage is inverted, the liquid crystal changes its molecular state as, illustrated in FIG. 5(C), and becomes transparent.

Figure 6:
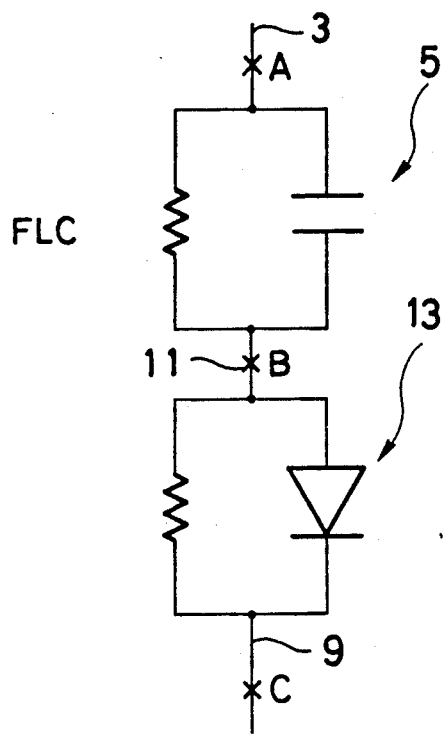
FIG. 6 is an equivalent circuit of liquid crystal devices manufactured in accordance with the present invention.
Figure 7:
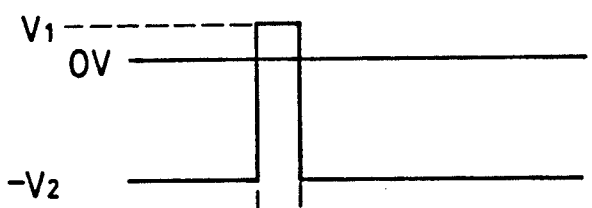
FIGS. 7(A) and 7(B) are graphical illustrations showing the voltage across a liquid crystal device responsive to a pulse signal.
Figure 7:
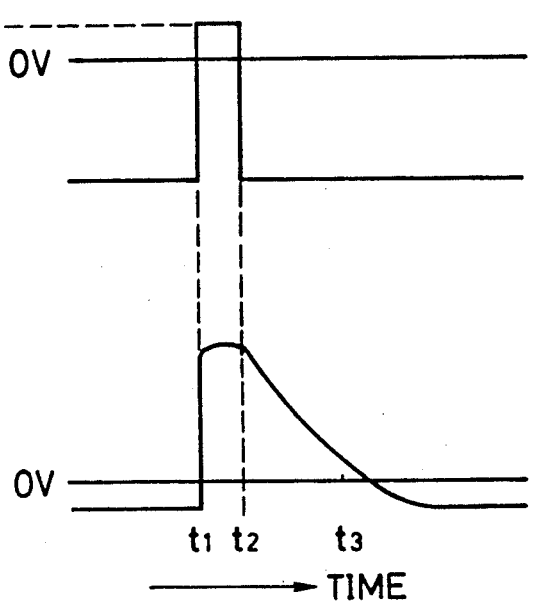

FIG. 6 is an equivalent circuit of one pixel, in which the liquid crystal layer 5 can be represented by a resistance and a capacitance connected in parallel. In response to a pulsed signal depicted in FIG. 7(A), the voltage across the liquid crystal layer changes as illustrated in FIG. 7(B). As shown in the figure, the voltage does not complete inversion until the discharge of the capacitor is finished. Namely, the time during which the liquid crystal layer is subjected to an electric field in the direction previously specified is elongated by $t_3-t_2$ as compared with the case without the diode 13. This apparently makes the contrast remarkable because of the elongated ON time. This elongation time, $t_3-t_2$, becomes long as the area ratio of pixel to diode increases.

Figure 8:
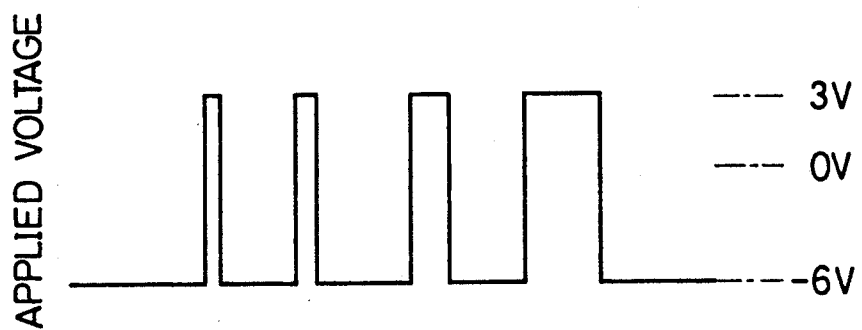
FIGS. 8(A) and 8(B) are graphical illustrations showing the voltage across a liquid crystal device responsive to a pulse sequence having diverse pulse widths.
Figure 8:
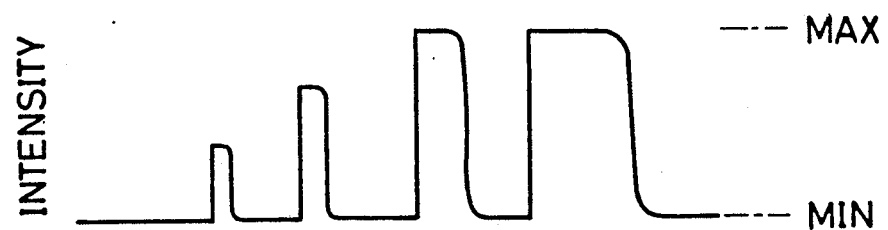
Figure 9:
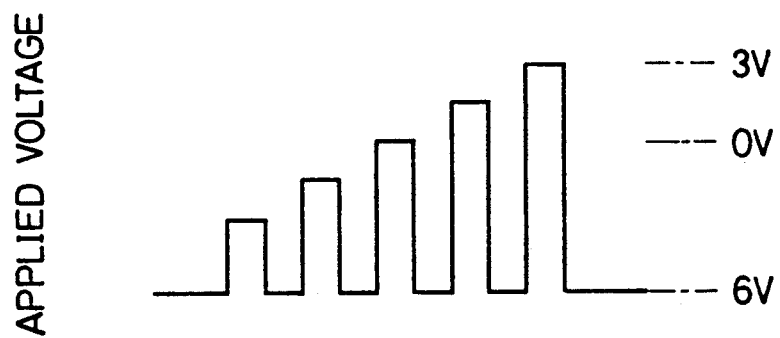
FIGS. 9(A) and 9(B) are graphical illustrations showing the voltage across a liquid crystal device responsive to a pulse sequence having diverse pulse heights.
Figure 9:
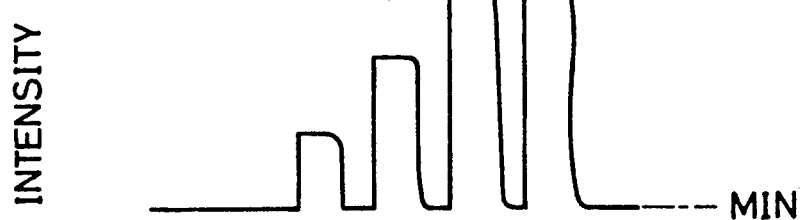

When the voltage applied to one pixel of the device was as shown in FIG. 8(A), the intensity of light passing through the pixel was as shown in FIG. 8(B). It is understood from the diagrams that the intensity of passing light can be controlled by adjusting the pulse width of the applied voltage. In the same way, the intensity of passing light was observed as shown in FIG. 9(A) in response to the input signal in FIG. 9(B). It is understood from FIGS. 9(A) and 9(B) that the intensity of passing light can be controlled also by adjusting the level of the applied voltage. In conclusion, grey-scale display can be realized by devices according to the present invention.

Figure 10A:
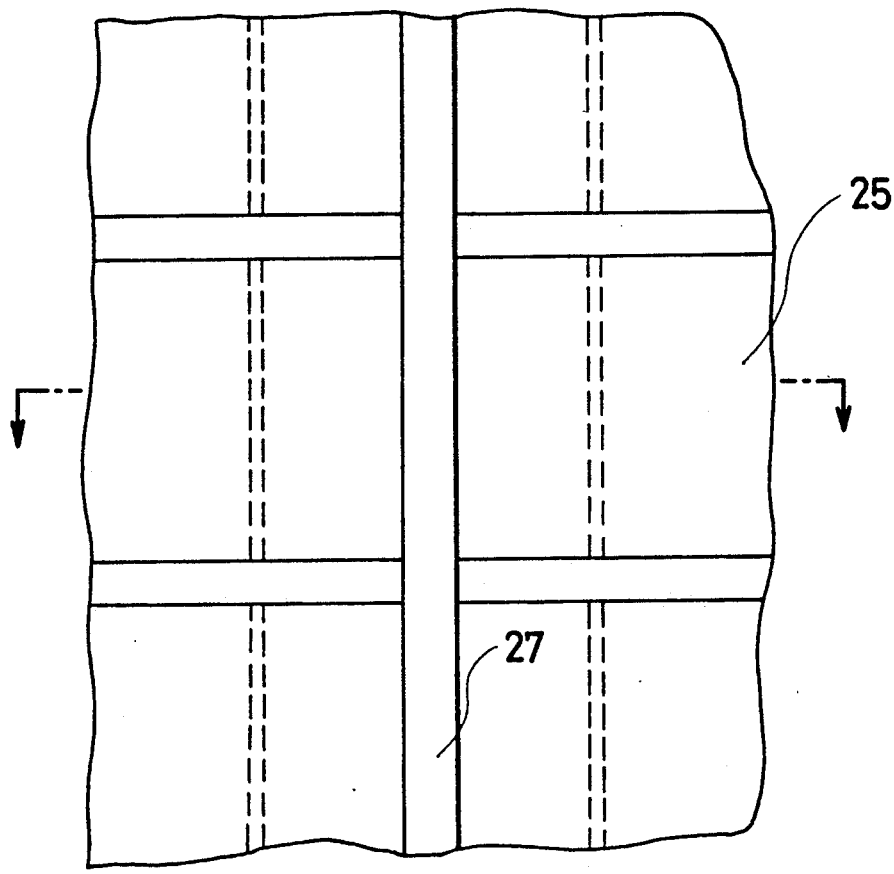
FIGS. 10(A) and 10(B) are a plan view and a cross sectional view showing another embodiment of the present invention.
Figure 10B:
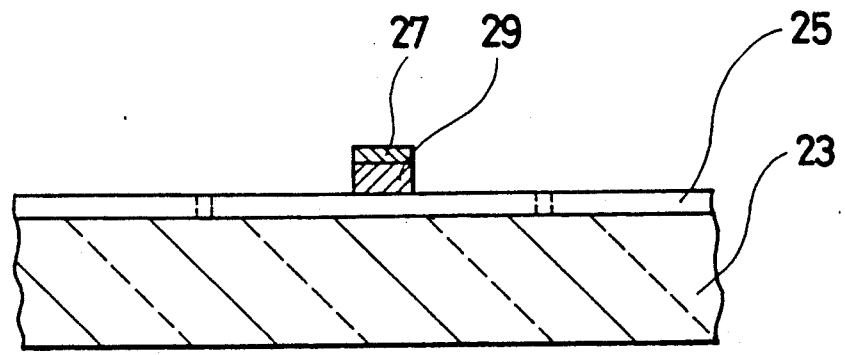

FIGS. 10(A) and 10(B) are a plan view and a cross sectional view for explaining another embodiment of the present invention. A substrate for liquid crystal device carrying driving diodes is manufactured as follows. An ITO film is formed on a glass substrate 23. The ITO film is patterned by etching into a plurality of parallel while strips extending in the lateral direction of the drawing. An amorphous silicon semiconductor film and an overlying conductive film are formed on the ITO film with a pin junction incorporated in the semiconductor. A substantial portion of the semiconductor film is removed in order to leave parallel narrow strips transversely covering only a 1/10 or less portion of each electrode. Then, the construction is as shown in FIGS. 10(A) and 10(B), in which the wide electrode strips 25 and the narrow electrode strips 27 are arranged crossing each other with the pin diodes therebetween.

A voltage is applied between the electrodes and the electrodes in order to repair short current paths which would be present in the pin junctions by burning. After the repairing is completed, each wide electrode is separated into pixels by removing the intervening portion depicted by broken lines. Then, an opposite substrate is joined to this substrate in the same way as described in the previous embodiment.

I claim:

1. In a method of manufacturing liquid crystal devices, the steps comprising:
   forming a first conductive film on a substrate;
   forming a semiconductor layer with a pin junction on said first conductive film;
   forming a second conductive film on said semiconductor layer;
   applying a voltage across said semiconductor layer in the reverse direction through said first and second conductive films in order to repair short current paths present in said semiconductor layer;
   patterning said first and second films and said semiconductor layer to produce a plurality of driving devices;
   forming a first electrode arrangement associated with said driving devices; and joining said substrate to an opposite substrate having a second arrangement with a liquid crystal layer therebetween.

2. The method of claim 1 wherein said semiconductor layer is made of a non-single-crystalline silicon semiconductor.

3. The method of claim 2 wherein said non-single-crystalline semiconductor is amorphous silicon semiconductor.

4. The method of claim 1 wherein said first and second electrode arrangements are designed to address particular pixels in the form of a matrix.

5. The method of claim 1 wherein said liquid crystal is a ferroelectric liquid crystal.

6. The method of claim 5 wherein the distance between said substrates is selected so wide as to allow the formation of molecular spirals of the liquid crystal layer.

* * * * *